US009800786B1

United States Patent
Wei

(10) Patent No.: US 9,800,786 B1
(45) Date of Patent: Oct. 24, 2017

(54) SHOOTING APPARATUS WITH STABILIZER MODULE

(71) Applicant: Guilin Feiyu Technology Corporation Ltd., Guilin, Guangxi (CN)

(72) Inventor: Chengyun Wei, Guangxi (CN)

(73) Assignee: Guilin Feiyu Technology Corporation Ltd., Guilin (CN)

( * ) Notice: Subject to any disclaimer, the term of this patent is extended or adjusted under 35 U.S.C. 154(b) by 0 days.

(21) Appl. No.: 15/176,209

(22) Filed: Jun. 8, 2016

(30) Foreign Application Priority Data

Apr. 20, 2016 (CN) .......................... 2016 1 0247742
Apr. 20, 2016 (CN) .......................... 2016 2 0335020

(51) Int. Cl.
*H04N 5/228* (2006.01)
*H04N 5/232* (2006.01)
*G02B 27/64* (2006.01)

(52) U.S. Cl.
CPC ......... *H04N 5/2328* (2013.01); *G02B 27/644* (2013.01); *H04N 5/23203* (2013.01)

(58) Field of Classification Search
CPC .................................................. H04N 5/2328
USPC .................................................... 348/208.99
See application file for complete search history.

(56) References Cited

U.S. PATENT DOCUMENTS

| 6,141,034 | A | * | 10/2000 | McCutchen | ........... | G02B 27/22 |
| | | | | | | 348/36 |
| 2002/0033434 | A1 | * | 3/2002 | Furuta | ................ | F16M 11/123 |
| | | | | | | 248/178.1 |
| 2012/0062691 | A1 | * | 3/2012 | Fowler | ................ | F16M 11/10 |
| | | | | | | 348/36 |
| 2014/0049632 | A1 | * | 2/2014 | Hemmer | ............. | G02B 21/367 |
| | | | | | | 348/79 |
| 2015/0170356 | A1 | * | 6/2015 | Simmons | ............. | G01N 21/956 |
| | | | | | | 348/87 |
| 2015/0281525 | A1 | * | 10/2015 | Thakur | ................ | H04N 5/2252 |
| | | | | | | 348/376 |

* cited by examiner

*Primary Examiner* — Usman Khan

(57) ABSTRACT

A stable and controllable shooting apparatus, comprising a shooting module, a stabilizer module and a main control module, wherein the shooting module and the stabilizer module are respectively connected with the main control module, the stabilizer module comprises a handheld part and an X-axis motor, a Y-axis motor, and a Z-axis motor which are arranged at top of the handheld part and are orthogonal in a space, wherein a stator of the Z-axis motor is connected with the handheld part, a rotor of the Z-axis motor is connected with a stator of the Y-axis motor, a rotor of the Y-axis motor is connected with a stator of the X-axis motor, and a rotor of the X-axis motor is connected with the shooting module. The stable and controllable shooting apparatus may be quickly stabilized during moving shooting and its shooting direction may be controlled.

8 Claims, 3 Drawing Sheets

SHOOTING APPARATUS WITH STABILIZER MODULE

CROSS-REFERENCE TO RELATED APPLICATIONS

The present application claims the benefit of Chinese Patent Application No. 201610247742.3 filed on Apr. 20, 2016 and Chinese Utility Model Application No. 201620335020.9 filed on Apr. 20, 2016, the contents of which are hereby incorporated by reference.

FIELD OF THE INVENTION

The present invention relates to shooting equipment such as video cameras and photo cameras, more particular to a stable and controllable shooting apparatus.

BACKGROUND OF THE INVENTION

The existing motion camera is consisting of camera lens, an imaging sensor, electronic parts and a housing. The lens is an imaging system for generating optical images of objects. The imaging sensor is a semiconductor device for transforming optical images into electrical signals. The electronic parts include a photometry system, a display system, a focusing system and other systems. These motion cameras may meet users' shooting requirements during moving shooting. However, the existing motion cameras do not have stabilization function and control function, and the cameras have to be static or move at the same speed as the moving object.

SUMMARY OF THE INVENTION

The present invention aims to solve a technical problem of providing a stable and controllable shooting apparatus, which may be quickly stabilized during moving shooting and its shooting direction may be controlled.

In order to solve the above technical problem, the present invention provides a stable and controllable shooting apparatus, comprising a shooting module, a stabilizer module and a main control module, wherein the shooting module and the stabilizer module are respectively connected with the main control module, wherein the stabilizer module comprises a handheld part and three motors, an X-axis motor, a Y-axis motor, and a Z-axis motor, which are arranged at top of the handheld part and are orthogonal in a space, wherein a stator of the Z-axis motor is connected with the handheld part, a rotor of the Z-axis motor is connected with a stator of the Y-axis motor, a rotor of the Y-axis motor is connected with a stator of the X-axis motor, and a rotor of the X-axis motor is connected with the shooting module.

In a preferred embodiment, the stabilizer module further comprises a button control circuit and a motor control circuit, wherein a signal output of the button control circuit is connected with a signal input of the motor control circuit by the main control module, and a signal output of the motor control circuit is connected with the X-axis motor, the Y-axis motor, and the Z-axis motor, respectively.

In a preferred embodiment, the shooting module comprises a camera body, shooting executive components and a shooting control circuit, wherein a signal output of the button control circuit is connected with a signal input of the shooting control circuit by the main control module, and a signal output of the shooting control circuit is connected with the shooting executive components, respectively.

In a preferred embodiment, the button control circuit is arranged within the handheld part, with buttons thereof protruding out of the handheld part, wherein the buttons include a four-direction navigation key, a function button and a confirm button.

In a preferred embodiment, the shooting control circuit is arranged within the camera body, and the shooting executive components include, but are not limited to, a lens, an imaging sensor, and a screen.

In a preferred embodiment, the rotor of the Z-axis motor is connected with the stator of the Y-axis motor via a first extension arm, the rotor of the Y-axis motor is connected with the stator of the X-axis motor via a second extension arm, and the rotor of the X-axis motor is connected with the shooting module via a third extension arm.

In a preferred embodiment, a distance between an axis extension line of the Z-axis motor and an axis extension line of the Y-axis motor is greater than a distance between the axis extension line of the Y-axis motor and an axis extension line of the X-axis motor.

In a preferred embodiment, a balance weight is arranged at one side of the X-axis motor away from the shooting module.

In a preferred embodiment, the handheld part is provided with an USB interface, which has one end connected to the shooting control circuit and the motor control circuit and another end connected to an external device.

In a preferred embodiment, mounting holes for connecting with external mount supports may be respectively arranged at the top and the bottom of the handheld part.

In a preferred embodiment, the handheld part is arranged with a battery and a battery compartment, wherein the battery is arranged inside the battery compartment to supply electricity for the shooting module, the stabilizer module and the main control module.

In a preferred embodiment, the shooting apparatus further comprises a wireless transceiver, by which the main control module is connected with external mobile terminals via wireless communication.

In a preferred embodiment, the shooting module further comprises a compensated light for improving a luminance of the object to be shot and a button for switching the function of the shooting module between photo shooting and video shooting.

Compared with the existing devices, the stable and controllable shooting apparatus according to the present invention has advantages as follows: By incorporating the shooting device and the stabilizer device, it has a small size and is convenient to carry. Due to the three motors orthogonally arranged in the space, the shooting module may be freely rotated in the three-dimensional space to facilitate a multi-angle shooting at relatively consistent shooting angles, and quickly stabilizing and controlling of the shooting apparatus may be realized during moving shooting.

BRIEF DESCRIPTION OF THE DRAWINGS

In order to better explain the embodiments of the present invention, figures are simply introduced as follows.

DETAILED DESCRIPTION OF ILLUSTRATED EMBODIMENTS

The present invention is further clearly and completely explained below in conjunction with figures. It is evident that the described embodiments are merely exemplary but not limited. Those skilled in the art may change or modify the embodiments to obtain equivalents without departing from the scope of the present invention.

Figure 1:
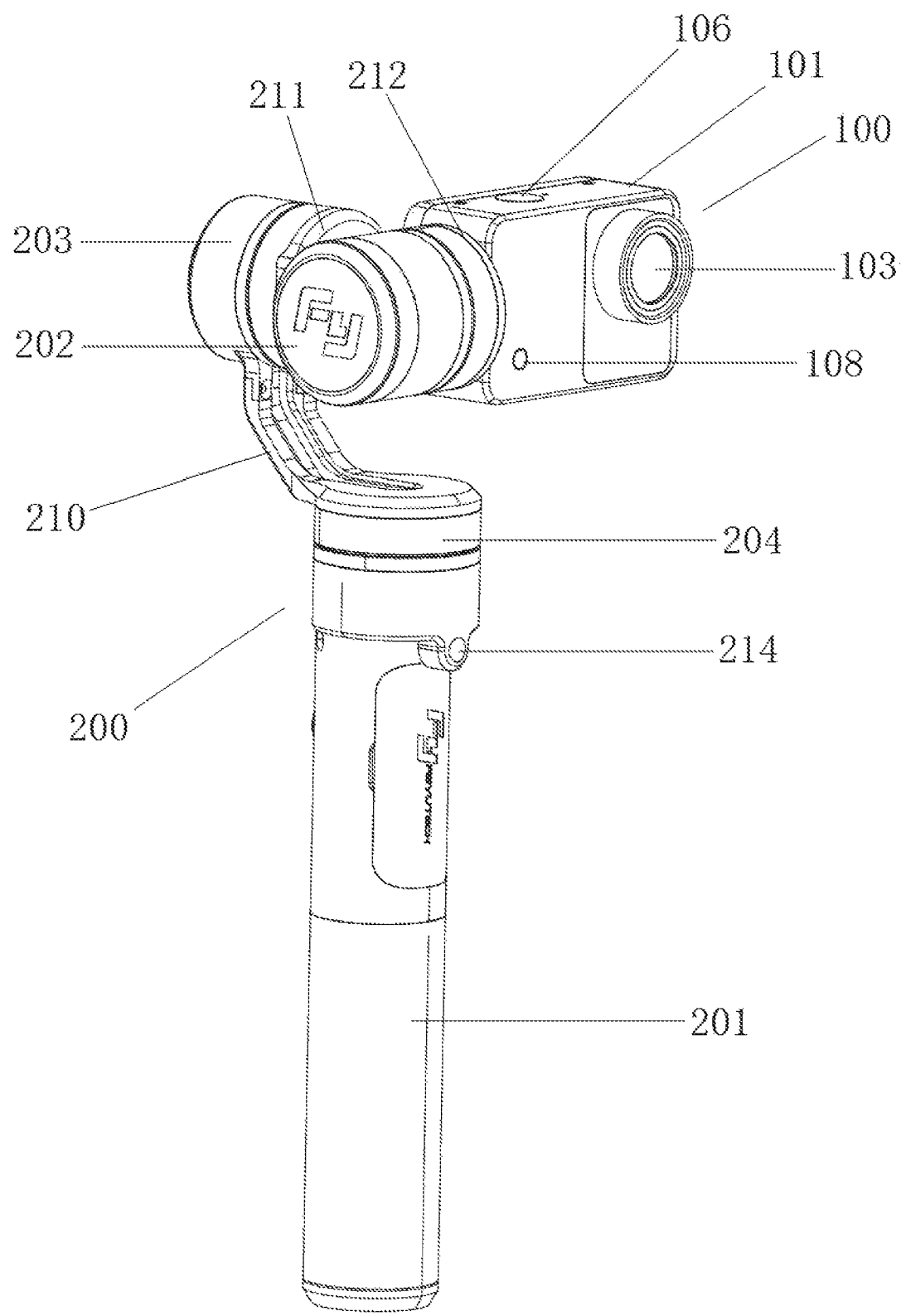
FIG. 1 is a perspective drawing of a stable and controllable shooting apparatus according to a preferred embodiment of the present invention.
Figure 2:
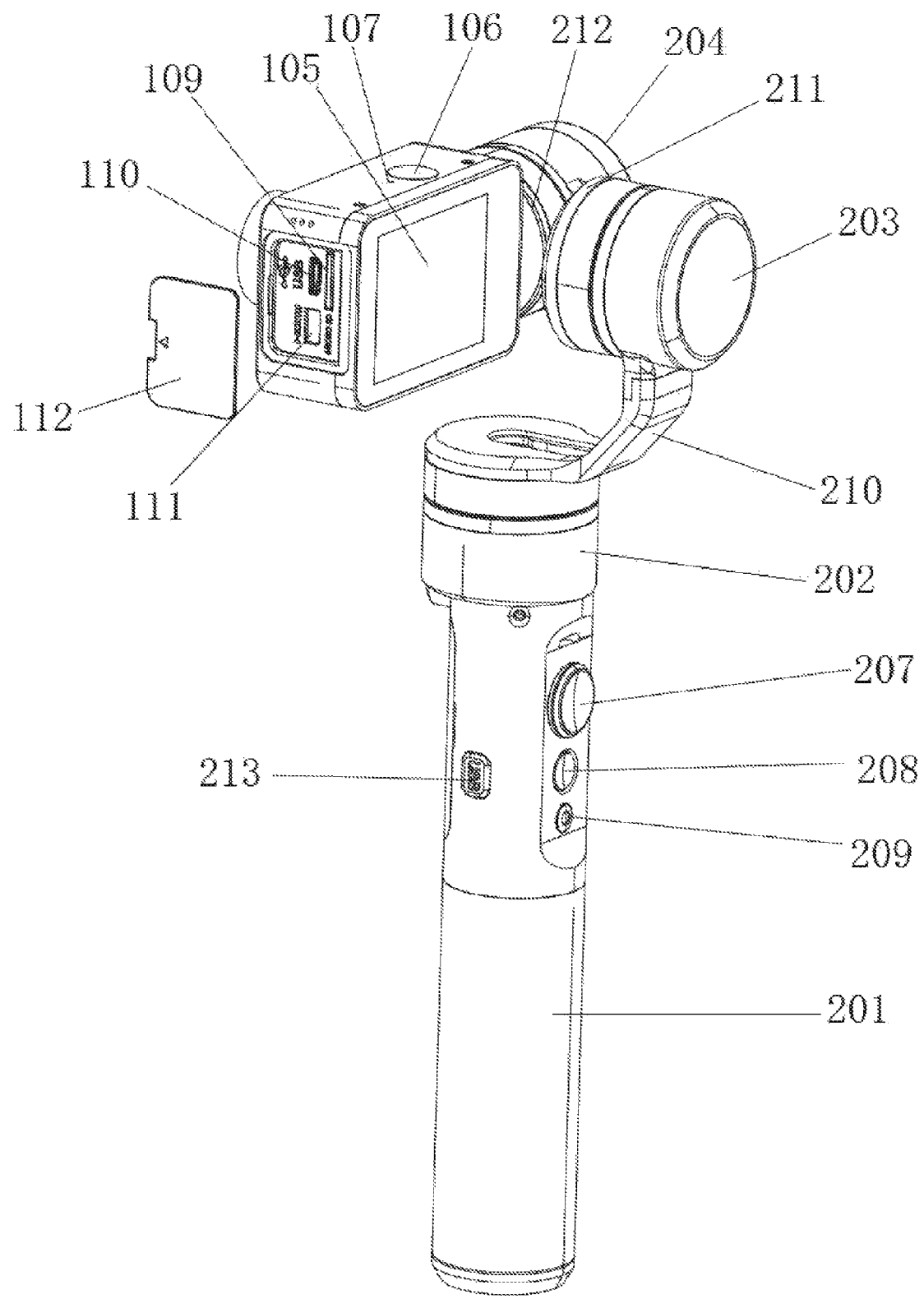
FIG. 2 is another perspective drawing of the stable and controllable shooting apparatus as shown in FIG. 1 from a different direction.
Figure 3:
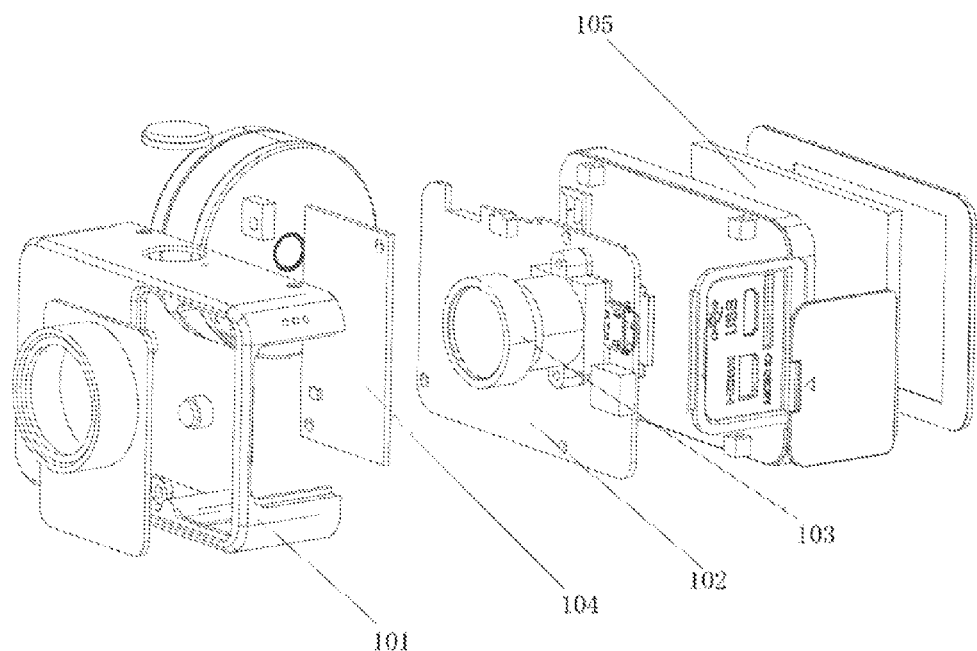
FIG. 3 is an exploded view of the shooting module of the stable and controllable shooting apparatus as shown in FIG. 1.
Figure 4:
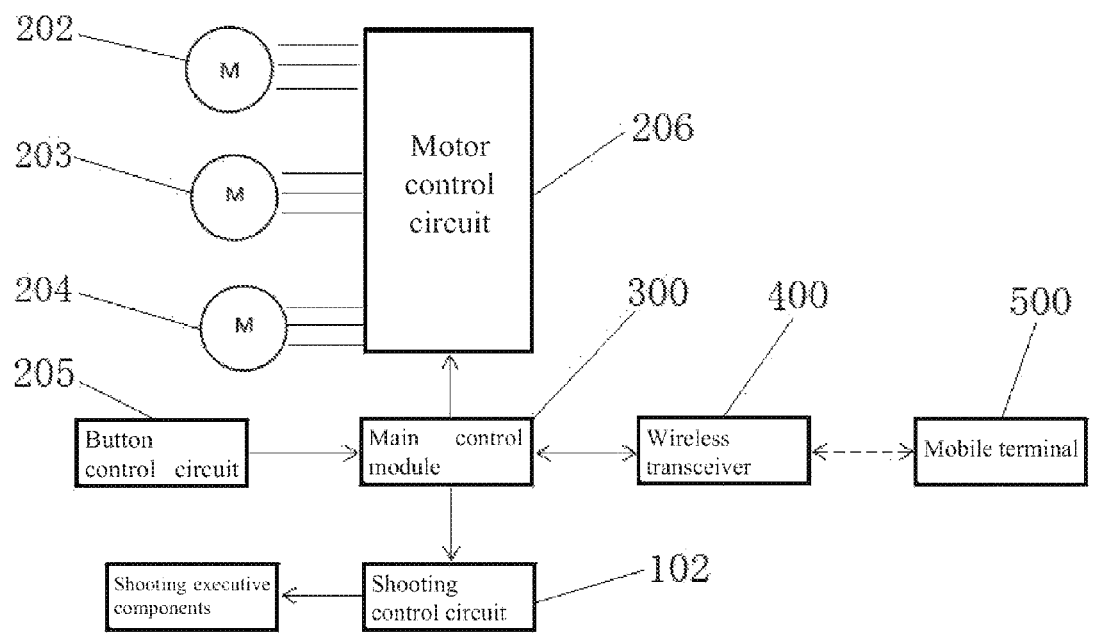
FIG. 4 is a schematic diagram of the shooting module and the stabilizer module.

Referring to FIGS. 1-4, the stable and controllable shooting apparatus according to a preferred embodiment of the present invention comprises a shooting module 100, a stabilizer module 200 and a main control module 300, wherein the shooting module 100 and the stabilizer module 200 are respectively connected with the main control module 300, wherein the stabilizer module 200 comprises a handheld part 201 and three motors, an X-axis motor 202, a Y-axis motor 203, and a Z-axis motor 204, which are arranged at top of the handheld part 201 and are orthogonal in a space, wherein a stator of the Z-axis motor 204 is connected with the handheld part 201, a rotor of the Z-axis motor 204 is connected with a stator of the Y-axis motor 203, a rotor of the Y-axis motor 203 is connected with a stator of the X-axis motor 202, and a rotor of the X-axis motor 202 is connected with the shooting module 100. Herein, the stators refer to fixed parts of the motors, and the rotors refer to rotating parts of the motors. The X-axis motor 202 is used for controlling pitching movement of the shooting module 100, the Y-axis motor 203 is used for controlling rolling movement of the shooting module 100, and the Z-axis motor 204 is used for controlling the yawing movement of the shooting module 100. In this way, due to the three motors orthogonally arranged in the space, the shooting module in the three-dimensional space may be rotated freely, and a multi-angle shooting at relatively consistent shooting angles may be realized.

Regarding the arrangement for the controlling of three motors, the stabilizer module 200 further comprises a button control circuit 205 and a motor control circuit 206. The signal output of the button control circuit 205 is connected with the signal input of the motor control circuit 206 by the main control module 300, and the signal output of the motor control circuit 206 is connected with the X-axis motor 202, the Y-axis motor 203, and the Z-axis motor 204, respectively. In this way, movements of the three motors are controlled by the motor control circuit 206 on the basis of the instruction signals sent from the button control circuit 205. It should be noted that an angle limit mechanism is arranged inside the X-axis motor 202 and the Y-axis motor 203, so that the X-axis motor 202 and the Y-axis motor 203 may be free to rotate at angles in their limited range, and the Z-axis motor 204 may be free to rotate 360 degrees. Preferably, the rotating shafts of the three motors may be hollow shafts, each with a slip ring arranged inside, so that the control line or electric wire passing through the motor would not rotate along with the motor.

In order to provide a rational arrangement and facilitate the operation, the handheld part 201 may be hollow inside. The button control circuit 205 and the motor control circuit 206 are arranged within the handheld part 201, and buttons of the button control circuit 205 protrude out of the handheld part 201.

The shooting module 100 comprises a camera body 101, shooting executive components and a shooting control circuit 102. The shooting control circuit 102 may be arranged within the camera body 101. The shooting executive components include, but are not limited to, a lens 103, an imaging sensor 104, and a screen 105, for realizing video and photo shooting functions. A signal output of the button control circuit 205 is connected with a signal input of the shooting control circuit 102 by the main control module 300, and a signal output of the shooting control circuit 102 is connected with the shooting executive components, respectively. In this way, on the basis of the instructions sent from the button control circuit 205, the shooting control circuit 102 controls working modes of the shooting executive components, such as working modes of focusing, framing, video shooting, photo shooting, previewing that are listed in the function menu. In addition, a switching button 106 is arranged above the camera body 101. When the switching button 106 is pressed, the function is switched between photo shooting and video shooting. When the switching button 106 is long-pressed, wireless connection such as WIFI, infrared communication, Bluetooth and so on may be created, and the wireless connection may be turned off when the switching button 106 is long-pressed again. Furthermore, an indicator light 107 may be arranged beside the switching button 106. Furthermore, a compensated light 108 for improving a luminance of the object to be shot may be arranged in front of the camera body 101. Moreover, an SD card 109, an USB interface 110, an HDMI interface 111 and a dust cap 112 may be arranged on the right side of the camera body 101. Moreover, threaded holes may be arranged on the left side of the camera body 101, and the camera body 101 may be fixedly connected with the rotor of the X-axis motor 202 through screws.

The buttons of the button control circuit 205 include a four-direction navigation key 207, a function button 208 and a confirm button 209. In the present embodiment, the movements of the X-axis motor 202 and the Z-axis motor 204 may be controlled by the four-direction navigation key 207. When an up key or a down key of the four-direction navigation key 207 is pressed, the rotating shaft of the X-axis motor 202 is rotated to lead the shooting module 100 to perform pitching movement. When a left key or a right key of the four-direction navigation key 207 is pressed, the rotating shaft of the Z-axis motor 204 is rotated to lead the shooting module 100 to perform yawing movement. The user may also select or exit a function menu of the shooting module 100 by the four-direction navigation key 207. Furthermore, by means of the function button 208, the stabilizer module 200 may be switched between three working modes. For example, when the function button 208 is pressed for one time, the stabilizer module 200 is switched to a yawing movement following mode (i.e. the Z-axis motor 204 is in an enabled state), in which pitch axis and roll axis are locked (i.e. both the X-axis motor 202 and the Y-axis motor 203 are in a lock state), and yaw axis is smoothly rotated according to the instruction of direction from the four-direction navigation key 207 which is manually operated. When the function button 208 is pressed for successive two times, the stabilizer module 200 is switched to a yawing movement and pitching movement following mode (i.e. both the Z-axis motor 204 and the X-axis motor 202 are in an enabled state), in which roll axis is locked (i.e. the Y-axis motor 203 is in a lock state), and yaw axis and pitch axis are smoothly rotated according to the instruction of direction from the four-direction navigation key 207 which is manually operated. When the function button 208 is long-pressed for one second, the stabilizer module 200 is switched to a locking mode, in which yaw axis, pitch axis and roll axis are all locked (i.e. the X-axis motor 202, the Y-axis motor 203 and the Z-axis motor 204 are all in a lock state). When the function button 208 is triple-clicked, the shooting apparatus may be switched to a function menu of the shooting module 100. The confirm button 209 is used for confirming photo shooting, video shooting, or other options of the function menu. For example, if the shooting apparatus is in a photo mode, the shooting module 100 takes a photo when the confirm button 209 is clicked, and if the shooting apparatus is in a record mode, it starts to record when the confirm button 209 is clicked and stops recording when the confirm button 209 is clicked again.

To provide enough space for the rotation of the shooting module 100, the rotor of the Z-axis motor 204 is connected with the stator of the Y-axis motor 203 via a first extension arm 210, the rotor of the Y-axis motor 203 is connected with the stator of the X-axis motor 202 via a second extension arm 211, and the rotor of the X-axis motor 202 is connected with the shooting module 100 via a third extension arm 212. Herein, a distance between an axis extension line of the Z-axis motor 204 and an axis extension line of the Y-axis motor 203 (or a vertical length of the L-shaped first extension arm 210) is greater than a distance between the axis extension line of the Y-axis motor 203 and an axis extension line of the X-axis motor 202 (or a vertical length of the L-shaped second extension arm 211). Preferably, the first extension arm 210 has a vertical length in the range of 18 mm to 24 mm, and the second extension arm 211 and the third extension arm 212 have a vertical length in the range of 4 mm to 10 mm. The third extension arm 212 is connected with a camera body 101 through screws.

On account of the center of gravity of the X-axis motor 202 biased to the shooting module 100, a balance weight (not shown in figures) may be arranged at an end of the X-axis motor 202 away from the shooting module 100, so as to try to keep the center of gravity over a extension line of a center line of the handheld part 201, thereby facilitating photo or video shooting by the user holding it.

Preferably, the handheld part 201 may be provided with an USB interface 213, which has one end connected to the shooting control circuit 102 and the motor control circuit 206, respectively, and another end connected to external devices. Preferably, the external device is a computer. Through the connection with the computer via the USB interface 213, the firmware of the stabilizer module 200 and the shooting module 100 may be upgraded and the parameters of the stabilizer module 200 and the shooting module 100 may be adjusted, and the stabilizer module 200 and the shooting module 100 may be controlled.

Preferably, mounting holes 214 for connecting with an external mount support may be respectively arranged at the top and the bottom of the handheld part 201.

Preferably, the handheld part 201 may be arranged with a battery and a battery compartment, wherein the battery may be arranged inside the battery compartment to supply electricity for the shooting module 100, the stabilizer module 200 and the main control module 300.

Preferably, the shooting apparatus further comprises a wireless transceiver 400, by which the main control module 300 may be connected with external mobile terminals 500 via wireless communication. The wireless transceiver 400 may communicate via WIFI, infrared communication, Bluetooth, radio frequency identification, 2G/3G/4G, etc. The mobile terminal 500 may be mobile phone, tablet computer, remote control, etc. In this way, the user may establish a wireless communication connection with the main control module 300 by means of mobile terminals 500 such as mobile phone, and a wireless control or remote control of the shooting module and the stabilizer module may be realized.

In general, the stable and controllable shooting apparatus according to the present invention incorporates the shooting device and the stabilizer device, has a small size and is convenient to carry. Due to the three motors orthogonally arranged in the space, the shooting module may be freely rotated in the three-dimensional space to facilitate a multi-angle shooting at relatively consistent shooting angles, and quickly stabilizing and controlling of the shooting apparatus may be realized during moving shooting.

All the above disclosed are merely the preferred embodiments of the present invention, but are not to limit the scope of the invention. The present invention is intended to cover all changes and equivalents included within the principle and the scope of the present invention.

What is claimed is:

1. A shooting apparatus with a stabilizer module, comprising a shooting module, a stabilizer module and a main control module, wherein the shooting module and the stabilizer module are respectively connected with the main control module, wherein the stabilizer module comprises a handheld part and three motors, an X-axis motor, a Y-axis motor, and a Z-axis motor, which are arranged at top of the handheld part and are orthogonal in a space, wherein a stator of the Z-axis motor is connected with the handheld part, a rotor of the Z-axis motor is connected with a stator of the Y-axis motor via a first extension arm, a rotor of the Y-axis motor is connected with a stator of the X-axis motor via a second extension arm, and a rotor of the X-axis motor is connected with the shooting module via a third extension arm;

the stabilizer module further comprises a button control circuit and a motor control circuit, wherein a signal output of the button control circuit is connected with a signal input of the motor control circuit by the main control module, and a signal output of the motor control circuit is connected with the X-axis motor, the Y-axis motor, and the Z-axis motor, respectively;

the button control circuit is arranged within the handheld part, with buttons thereof protruding out of the handheld part, wherein the buttons include a four-direction navigation key, a function button and a confirm button;

the four-direction navigation key controls the movements of the X-axis motor and the Z-axis motor; a rotating shaft of the X-axis motor is rotated to lead the shooting module to perform pitching movement when an up key or a down key of the four-direction navigation key is pressed; a rotating shaft of the Z-axis motor is rotated to lead the shooting module to perform yawing movement when a left key or a right key of the four-direction navigation key is pressed; selection or exit of a function menu of the shooting module is controlled by the four-direction navigation key;

the stabilizer module is switched among different working modes as follows by means of the function button: when the function button is pressed for one time, the stabilizer module is switched to a yawing movement following mode, in which the Z-axis motor is in an enabled state while both the X-axis motor and the Y-axis motor are in a lock state; when the function button is pressed for successive two times, the stabilizer module is switched to a yawing movement and pitching movement following mode, in which both the Z-axis motor and the X-axis motor are in an enabled state while the Y-axis motor is in a lock state; when the function button is long-pressed for one second, the stabilizer module is switched to a locking mode, in which the X-axis motor, the Y-axis motor and the Z-axis motor are all in a lock state; when the function button is triple-clicked, the shooting apparatus is switched to the function menu of the shooting module;

the confirm button is used for confirming photo shooting, video shooting, or other options of the function menu;

a balance weight is arranged at one side of the X-axis motor away from the shooting module;

mounting holes for connecting with an external mount support are respectively arranged at the top and the bottom of the handheld part.

2. The shooting apparatus according to claim 1, characterized in that: the shooting module comprises a camera body, shooting executive components and a shooting control circuit, wherein the signal output of the button control circuit is connected with a signal input of the shooting control circuit by the main control module, and a signal output of the shooting control circuit is connected with the shooting executive components, respectively.

3. The shooting apparatus according to claim 2, characterized in that: the shooting control circuit is arranged within the camera body, and the shooting executive components include, but are not limited to, a lens, an imaging sensor, and a screen.

4. The shooting apparatus according to claim 1, characterized in that: a distance between an axis extension line of the Z-axis motor and an axis extension line of the Y-axis motor is greater than a distance between the axis extension line of the Y-axis motor and an axis extension line of the X-axis motor.

5. The shooting apparatus according to claim 1, characterized in that: the handheld part is arranged with an USB interface which has one end connected to the shooting control circuit and the motor control circuit respectively and another end connected to an external device.

6. The shooting apparatus according to claim 1, characterized in that: the handheld part is arranged with a battery and a battery compartment, wherein the battery is arranged inside the battery compartment to supply electricity for the shooting module, the stabilizer module and the main control module.

7. The shooting apparatus according to claim 1, characterized in that: the shooting apparatus further comprises a wireless transceiver, by means of which the main control module establishes a wireless communication with an external mobile terminal.

8. The shooting apparatus according to claim 2, characterized in that: the shooting module further comprises a compensated light for improving a luminance of an object to be shot and a switching button for switching the function of the shooting module between photo shooting and video shooting.

* * * * *